United States Patent [19]
Okamura et al.

[11] Patent Number: 5,560,656
[45] Date of Patent: Oct. 1, 1996

[54] PIPE CONNECTING STRUCTURE

[75] Inventors: Koji Okamura, Toyama; Takashi Watanabe, Tokyo, both of Japan

[73] Assignees: CK Metals, Ltd., Toyama; Nishihara Engineering Co., Ltd., Tokyo, both of Japan

[21] Appl. No.: 300,124

[22] Filed: Sep. 2, 1994

[30] Foreign Application Priority Data

Sep. 17, 1993 [JP] Japan .................. 5-050714 U

[51] Int. Cl.$^6$ ............................................ F16L 9/14
[52] U.S. Cl. .................... 285/55; 285/110; 285/330; 285/367; 285/379; 285/906
[58] Field of Search .................... 285/330, 367, 285/366, 365, 363, 110, 111, 406, 906, 379, 55

[56]         References Cited

U.S. PATENT DOCUMENTS

| | | | |
|---|---|---|---|
| 1,816,293 | 7/1931 | Oberhuber | 285/110 X |
| 1,863,122 | 6/1932 | Matthews | 285/367 X |
| 2,273,210 | 2/1942 | Lowther et al. | 285/410 |
| 3,045,857 | 7/1962 | Lineweber | 285/365 X |
| 3,240,501 | 3/1966 | Smith | 285/367 X |
| 4,326,737 | 4/1982 | Lehmann | 285/365 X |
| 4,496,176 | 1/1985 | Weinhold | 285/409 X |
| 4,568,109 | 2/1986 | Prueter | 285/55 X |
| 4,919,453 | 4/1990 | Halling et al. | 285/367 X |
| 4,962,958 | 10/1990 | Takei | 285/55 |
| 5,219,187 | 6/1993 | Mikitka | 285/55 |

*Primary Examiner*—Dave W. Arola
*Attorney, Agent, or Firm*—Rothwell, Figg, Ernst & Kurz

[57]            ABSTRACT

A pipe connecting structure is provided to mutually join tubes, and includes a pair of flanges formed at end surfaces of a pair of pipes to be connected so as to be opposed to one another, a back-up ring interposed between the pair of flanges, a projection of the back-up ring into which the pair of flanges are fitted, and a rubber packing provided for an inner periphery of the back-up ring to be expanded and deformed in response to internal pressure of the tubes. In the pipe connecting structure, the pair of flanges are brought into pressure contact with the rubber packing and the pair of pipes are coaxially supported by clamping a housing by clamping measures.

13 Claims, 14 Drawing Sheets

PIPE CONNECTING STRUCTURE

BACKGROUND OF THE INVENTION

1. Field of the Invention

The present invention relates to a pipe connecting structure to mutually join pipes.

2. Description of the Prior Art

There are known various methods of joining pipes mutually. For example, steel pipes are mutually connected by employing a screwed joint method, a flange joint method, a welded joint method, and so forth.

In the screwed joint method, pipe ends of both of pipes to be connected are machined by a thread cutting device so as to form external threads, and seal material (a joint seal or the like) is applied to the external threads. Thereafter, the external threads are screwed into a coupling having internal threads, thereby mutually joining the pipes. The method is chiefly effective in mutually connecting steel pipes having small diameters.

In the flange joint method, as in the case of the screwed joint method, the pipe ends of both the pipes to be connected are machined to form the external threads, and the external threads of the pipes are respectively screwed into flanges having an internal thread. Further, a packing is interposed between the flanges, and the flanges are mutually clamped by a bolt and a nut, thereby mutually joining the pipes. The method is chiefly effective in mutually connecting steel pipes having large diameters.

In the welded joint method, edge preparation is applied by a beveling machine to the pipe ends of both the pipes to be connected, and brazing material is temporarily tacked into a V-shaped groove defined by the mutually butted pipe ends. Further, after centering, an electric welder is used to melt the brazing material so as to join the pipes forming the V-shaped groove. The method is chiefly effective in mutually connecting the steel pipes having the large diameters.

A brazing joint method is also employed to mutually connect the steel pipes. In the brazing joint method, sealant (flux) is applied to the steel pipe and a steel joint, and a pipe end is inserted into the joint which is preheated by a heater such as torch lamp. After preheating, steel pipe brazing material is poured into a gap between the pipe and the joint, thereby joining the pipes.

Alternatively, stainless pipes are mutually connected by employing a mechanical joint method, or the welded joint method. In the mechanical joint method, a diameter of a pipe end is extended or reduced by a dedicated jig, and a packing formed according to a shape of the pipe end is mounted to the extended or reduced pipe end, thereafter clamping by a threaded cap nut. The method is effective in mutually connecting stainless pipes having small diameters. As in the case of the steel pipes, the welded joint method is carried out by using stainless pipe brazing material and a dedicated welding machine. The method is effective in mutually connecting stainless pipes having large diameters.

As set forth above, one of various joint methods is conventionally employed according to material or a diameter of a tube. Thus, there are such problems that these various methods require dedicated machines, dedicated jigs, tools and so forth, and operation requires a skilled operator. Further, it is difficult to ensure a sufficient pressure resistant and water resistant performance by a simple operation.

SUMMARY OF THE INVENTION

The present invention is performed to resolve the above problems. It is an object of the present invention to provide a pipe connecting structure which can be provided without using various dedicated machines, jigs, tools, and so forth according to material or a diameter of a tube, and whose operation can be easily carried out without a skilled operator so as to exhibit a sufficient pressure resistant and water resistant performance.

According to the first aspect of the present invention, for achieving the above-mentioned object, there is provided a pipe connecting structure in which a pair of flanges are formed at ends of a pair of pipes to be connected and are opposed to one another, and a back-up ring is interposed between the pair of flanges to fit the pair of flanges into projections of the back-up ring. Further, a rubber packing is provided for an inner periphery of the back-up ring to be expanded and deformed in response to internal pressure of the tubes, and the pair of flanges are brought into pressure contact with the rubber packing and the pair of pipes are coaxially supported by clamping a housing by clamping means.

As stated above, in the pipe connecting structure according to the first aspect of the present invention, the projections of the back-up ring are fitted into the flange formed at the end of the one pipe to anchor the back-up ring to the flange of the one tube, and the flange formed at the end of the other pipe is fitted into the projections of the anchored back-up ring to anchor the other pipe to the back-up ring. Further, the pair of flanges and the back-up ring are covered with the housing, and the pair of flanges are brought into pressure contact with the rubber packing, and the pair of pipes are coaxially supported by clamping the housing by the clamping means. As set forth above, since the pair of flanges and the back-up ring can be temporarily tacked, the pipe connection can be carried out by only one operator even in case of pipes having large diameters.

According to the second aspect of the present invention, there is provided a pipe connecting structure in which a housing includes a pair of half-divided bodies having a semicircular arc-like form to interpose flanges of pipes therebetween from the outside of a radial direction so as to provide a state where the flanges of the pair of pipes to be connected and a back-up ring including a rubber packing and projections are accommodated in the housing. Further, the half-divided bodies are provided integrally with collar portions axially and outwardly extending from inner peripheral ends of both side walls of the respective half-divided bodies. The collar portions have the semicircular arc-like inner peripheral surfaces which are brought by clamping means into pressure contact with outer peripheral surfaces of the pair of pipes to be connected in the vicinity of the flanges in a surface contact state.

As stated above, in the pipe connecting structure according to the second aspect of the present invention, the pair of half-divided bodies forming the housing are clamped so as to provide the state where the flanges of the pair of pipes and the back-up ring including the rubber packing and the projections are accommodated in the housing. The collar portions are provided integrally with the inner peripheral ends of the both side walls of the pair of half-divided bodies to extend axially and outwardly, and are clamped and brought into pressure contact with the outer peripheral surfaces of the pair of pipes in the vicinity of the flanges in the surface contact state. This extends an area where the half-divided bodies mutually come into pressure contact with the pair of tubes. As a result, mutual centers of the pipes to be connected can be naturally aligned with high accuracy, strength of the housing can be improved by the pair of half-divided bodies, and highly reliable pipe connection can be carried out.

According to the third aspect of the present invention, there is provided a pipe connecting structure in which a pair of half-divided bodies forming a housing are opposed to one another, and opposed portions on both sides are clamped by bolts serving as clamping means to assemble the pair of half-divided bodies into a ring-like form.

As stated above, in the pipe connecting structure according to the third aspect of the present invention, the pair of half-divided bodies forming the housing are opposed to one another, and the opposed portions on both the sides are clamped by the bolts serving as the clamping means to assemble the pair of half-divided bodies into the ring-like form. Therefore, a pair of flanges and a back-up ring are temporarily tacked, and thereafter the housing can be clamped from the outside.

According to the fourth aspect of the present invention, there is provided a pipe connecting structure in which a pair of half-divided bodies are opposed to one another, and one pair of opposed portions are coupled by a hinge and the other pair of opposed portions are clamped by a bolt to assemble the pair of half-divided bodies into a ring-like form.

As stated above, in the pipe connecting structure according to the fourth aspect of the present invention, the pair of half-divided bodies are opposed to one another, and the one opposed portions are coupled by the hinge and the other opposed portions are clamped by the bolt to assemble the pair of half-divided bodies into the ring-like form. Therefore, it is possible to facilitate assembly of a housing.

According to the fifth aspect of the present invention, there is provided a pipe connecting structure in which a bolt clamping a pair of half-divided bodies is swingably supported by one half-divided body, and the bolt is positioned at a clamping position of the other half-divided body by swinging the bolt.

As stated above, in the pipe connecting structure according to the fifth aspect of the present invention, the bolt clamping the pair of half-divided bodies is swingably supported by the one half-divided body, and the bolt is positioned at the clamping position of the other half-divided body by swinging the bolt. Therefore, the bolt can be easily mounted and clamped.

According to the sixth aspect of the present invention, there is provided a pipe connecting structure in which a nut slip preventing groove is provided in a half-divided body so as to avoid slip of a nut into which a bolt is screwed to clamp a pair of half-divided bodies.

As stated above, in the pipe connecting structure according to the sixth aspect of the present invention, the nut slip preventing groove is provided in the half-divided body so as to avoid the slip of the nut into which the bolt is screwed to clamp the pair of half-divided bodies. Therefore, it is possible to easily clamp the bolt.

According to the seventh aspect of the present invention, there is provided a pipe connecting structure in which grooves are provided in inner peripheries of a pair of half-divided bodies forming a housing, and projections of a back-up ring are fitted into the grooves.

As stated above, in the pipe connecting structure according to the seventh aspect of the present invention, the grooves are provided in the respective inner peripheries of the pair of half-divided bodies forming the housing, and the projections of the back-up ring are fitted into the grooves. Therefore, it is possible to more easily position the housing with respect to the back-up ring.

According to the eighth aspect of the present invention, there is provided a pipe connecting structure in which a projection of a back-up ring is provided in a ring-like form, and the projection extends over an entire outer periphery of a back-up ring body.

As stated above, in the pipe connecting structure according to the eighth aspect of the present invention, the projection of the back-up ring is provided in the ring-like form, and the projection extends over the entire outer periphery of the back-up ring body. Therefore, it is possible to anchor the back-up ring to one flange by fitting the one flange into the projection, and anchor the other flange to the back-up ring by fitting the other flange into the projection.

According to the ninth aspect of the present invention, there is provided a pipe connecting structure in which projections of a back-up ring extend from an outer periphery of a back-up ring body at predetermined intervals.

As stated above, in the pipe connecting structure according to the ninth aspect of the present invention, the projections of the back-up ring extend from the outer periphery of the back-up ring body at the predetermined intervals. Therefore, it is possible to realize cost reduction.

According to the tenth aspect of the present invention, there is provided a pipe connecting structure in which a projection is secured to a back-up ring body through a mounting member, and a pair of flanges are fitted into the projection.

As stated above, in the pipe connecting structure according to the tenth aspect of the present invention, the projection is secured to the back-up ring body through the mounting member, and the pair of flanges are fitted into the projection. Therefore, it is possible to easily mount the projection to a back-up ring.

According to the eleventh aspect of the present invention, there is provided a pipe connecting structure in which a flat bar is formed into a back-up ring.

As stated above, in the pipe connecting structure according to the eleventh aspect of the present invention, the flat bar is formed into the back-up ring. Therefore, production can be facilitated.

According to the twelfth aspect of the present invention, there is provided a pipe connecting structure in which a peripheral surface of a back-up ring is coated with anti-corrosive and insulating resin.

As stated above, in the pipe connecting structure according to the twelfth aspect of the present invention, the peripheral surface of the back-up ring is coated with the anti-corrosive and insulating resin. Therefore, it is possible to mutually connect light metal pipes made of different materials.

According to the thirteenth aspect of the present invention, there is provided a pipe connecting structure in which an inner periphery of a housing is coated with anti-corrosive and insulating resin.

As stated above, in the pipe connecting structure according to the thirteenth aspect of the present invention, the inner periphery of the housing is coated with the anti-corrosive and insulating resin. Therefore, it is possible to mutually connect light metal tubes.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

DETAILED DESCRIPTION OF THE PREFERRED EMBODIMENTS

Embodiment 1

Figure 1:
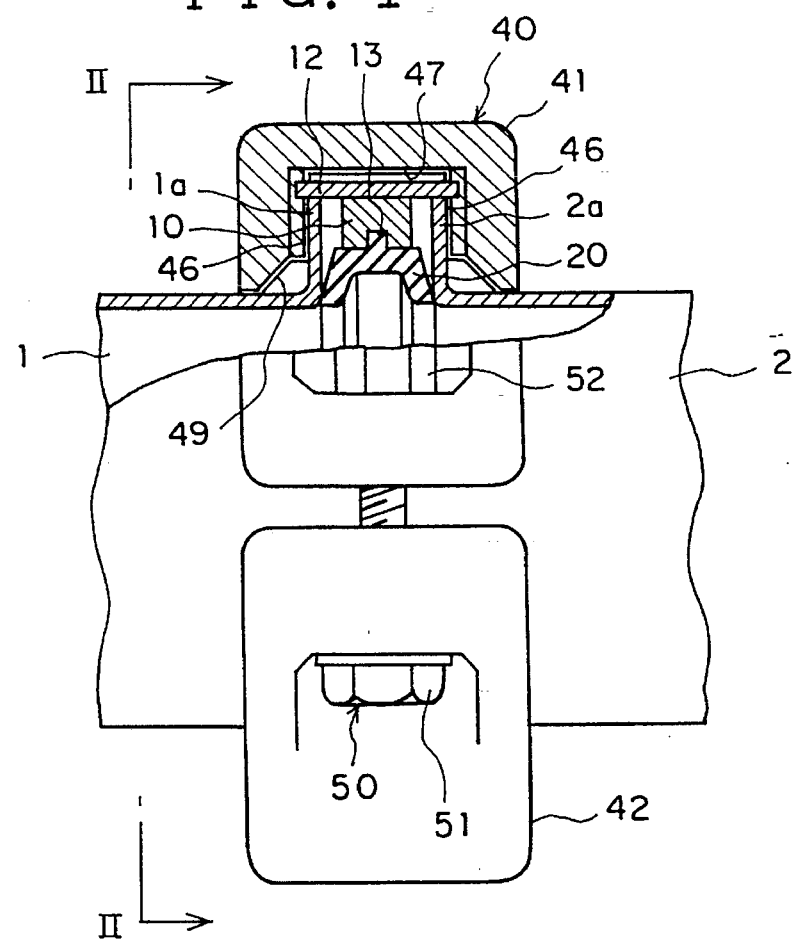
FIG. 1 is a sectional view showing a pipe connecting structure according to the embodiment 1 of the present invention.
Figure 2:
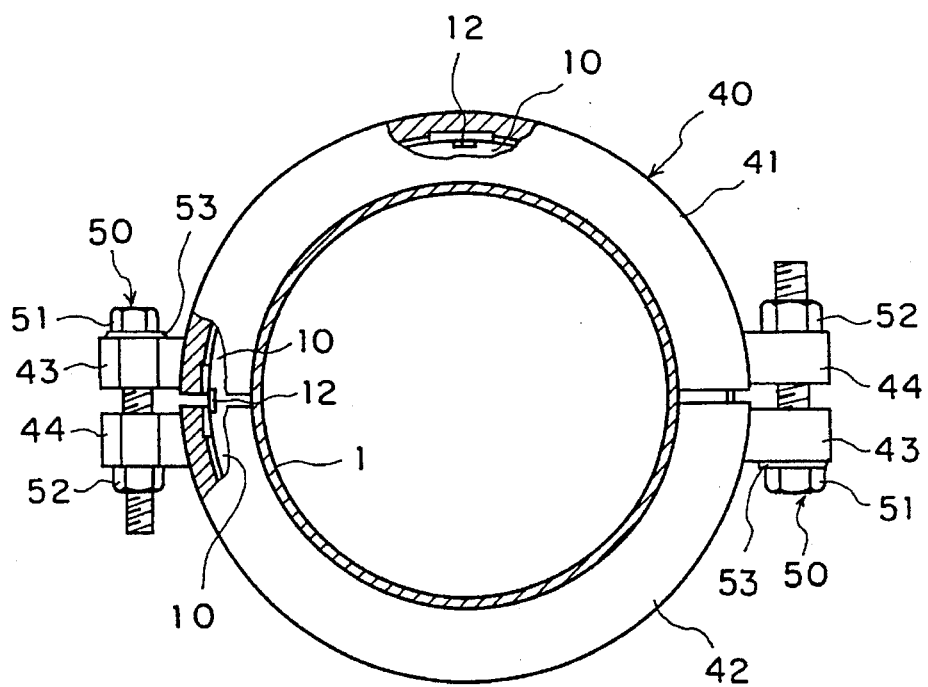
FIG. 2 is a sectional view taken along line II—II of FIG. 1.

A preferred embodiment of the invention will now be described in detail referring to the accompanying drawings. FIG. 1 is a sectional view showing a pipe connecting structure according to one embodiment in the first, second, fifth, sixth, eighth, ninth, eleventh, and twelfth aspects of the present invention. FIG. 2 is a sectional view taken along line II—II of FIG. 1. In the drawings, reference numeral 1 means one pipe to be connected, 2 is the other tube, 10 is a back-up ring having a ring-like form, 20 is a rubber packing, 40 is a housing, and 50 is clamping means.

Figure 3:
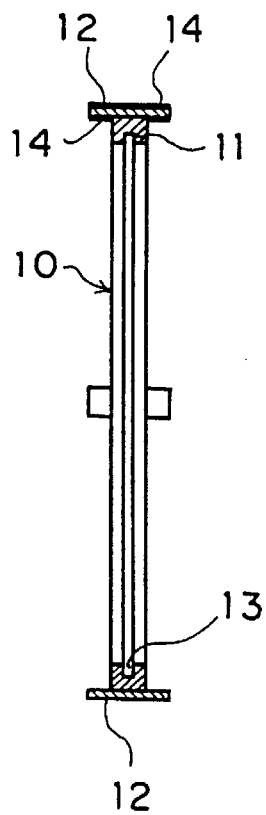
FIG. 3 is a sectional view showing a back-up ring used in the pipe connecting structure according to the embodiment 1 of the present invention.
Figure 4:
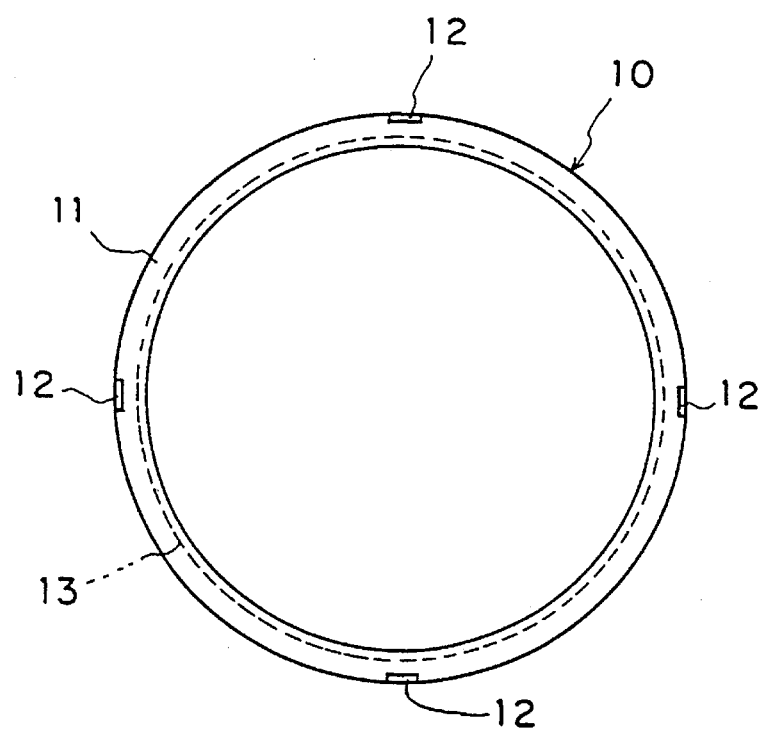
FIG. 4 is a front view of the back-up ring shown in FIG. 3.

At ends of the pipes 1 and 2, pipe walls are radially bent to form flanges 1a and 2a. These flanges 1a and 2a are opposed to one another, and the back-up ring 10 is disposed between the flanges 1a and 2a. As shown in FIGS. 3 and 4, the back-up ring 10 is provided with projections 12 which are fitted into both the flanges 1a and 2a, and the projections 12 extend from both side surfaces of an outer periphery of a back-up ring body 11. The projections 12 may be integrally formed with the outer periphery of the back-up ring body 11, or may be fixed through screws and so forth. Alternatively, the projections 12 may be supported so as to be optionally accommodated in the outer periphery of the back-up ring body 11. In this case, the projections 12 are rotatably supported through screws and so forth, and grooves are provided in the back-up ring body 11 to accommodate the projections 12. It is thereby possible to accommodate the projections 12 in the grooves of the back-up ring body 11.

Figure 5:
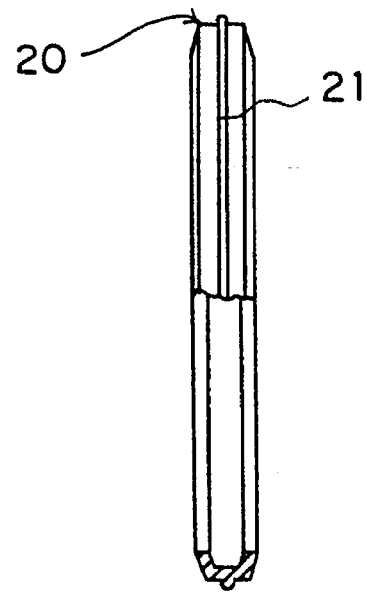
FIG. 5 is a sectional view showing a rubber packing used in the pipe connecting structure according to the embodiment 1 of the present invention.

Further, a groove 13 is provided in an inner periphery of the back-up ring body 11. An extending strip portion 21 (see FIG. 5) extends from an outer periphery of the rubber packing 20 and is fitted into the groove 13, thereby attaching the rubber packing 20 to an inner periphery of the back-up packing 10. A peripheral surface of the back-up ring 10 is coated with resin 14 such as epoxy resin (see FIG. 3). The rubber packing 20 is opened on the side of the inner periphery to have a channel-shaped section. As shown in FIG. 1, the rubber packing 20 is set to have a width larger than that of the back-up ring body 11, and the rubber packing 20 is brought into pressure contact with the flanges 1a and 2a. Further, the rubber packing 20 is set to have an inner diameter dimension which is substantially identical with inner diameter dimensions of the pipes 1 and 2.

Figure 6:
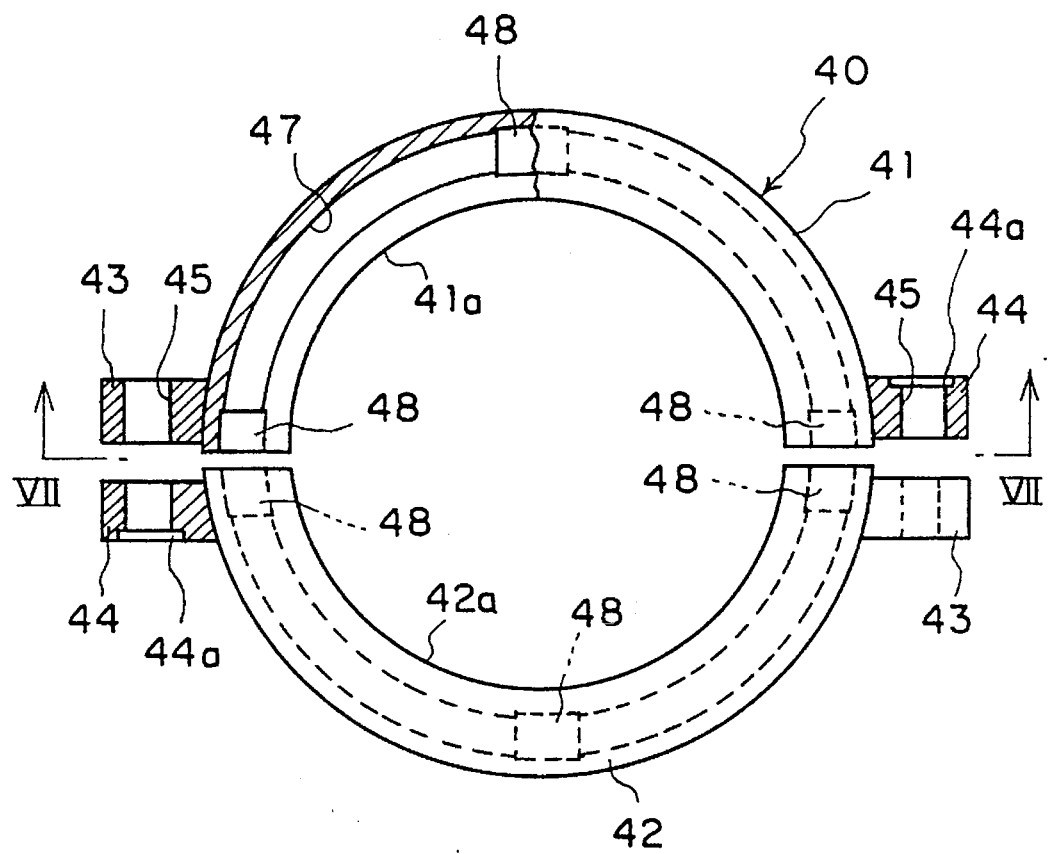
FIG. 6 is a sectional view of a housing used in the pipe connecting structure according to the embodiment 1 of the present invention.

The housing 40 is disposed outside the flanges 1a and 2a disposed on both sides of the back-up ring 10. As shown in FIG. 6, the housing 40 includes an upper half-divided body 41 and a lower half-divided body 42, and the half-divided bodies 41 and 42 are respectively provided in a semicircular arc-like form. In the respective half-divided bodies 41, 42, inner peripheral grooves 47 are opened to have a channel-shaped section (see FIG. 1). Connecting brackets 43 and 44 extend radially and outwardly from right and left ends of the respective half-divided bodies 41 and 42. Bolt inserting holes 45 are provided in the brackets 43 and 44, and nut accommodating grooves 44a are provided in the brackets 44 coaxially with the bolt inserting holes 45. A nut 52 as will be described infra can be fitted into the nut accommodating groove 44a so as to prevent the nut 52 from slipping. Alternatively, no nut accommodating groove 44a may be provided in the bracket 44. That is, a bolt (a coupling member) 51 serving as the clamping means 50 passes through the bolt inserting hole 45 to be screwed with the nut 52, thereby mutually coupling the brackets 43 and 44 (see FIG. 2). It is thereby possible to assemble the housing 40 into a ring-like form, and mount the housing 40 to the outside of the flanges 1a and 2a. In this case, the housing 40 accommodates the flanges 1a and 2a, and the back-up ring 10. In FIG. 2, reference numeral 53 means a spring washer.

Figure 7:
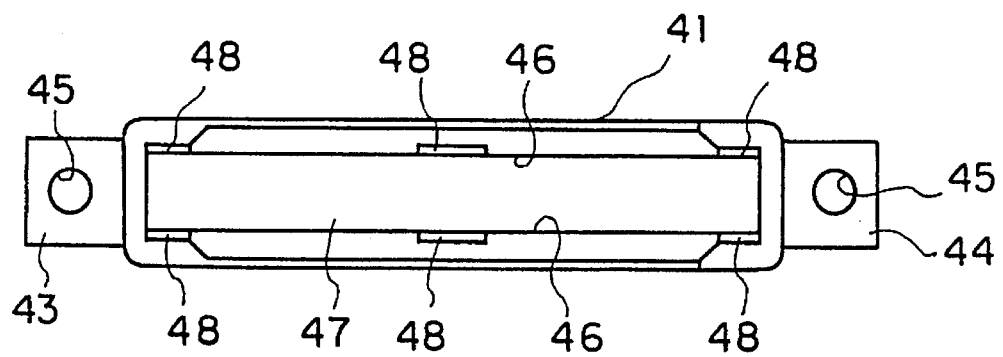
FIG. 7 is a diagram taken along line VII—VII of FIG. 6.

In an assembled state of the housing 40, a pair of side walls 46 of the housing 40 press back faces of the flanges 1a and 2a, and the flanges 1a and 2a are thereby brought into pressure contact with the rubber packing 20. As described above, the inner peripheral grooves 47 are provided in the inner peripheries of the half-divided bodies 41 and 42, and the back-up ring 10 is fitted into the inner peripheral grooves 47. Grooves 48 are provided in the inner peripheral groove 47 such that the projections 12 of the back-up ring 10 are fitted into the grooves 48 (only the half-divided body 41 being shown in FIG. 7). The projections 12 are fitted into the grooves 8 by assembling the housing 40. Further, as shown in FIG. 1, the inner peripheries 47 of the half-divided bodies 41 and 42 are coated with resin 49 such as epoxy resin.

Figure 8:
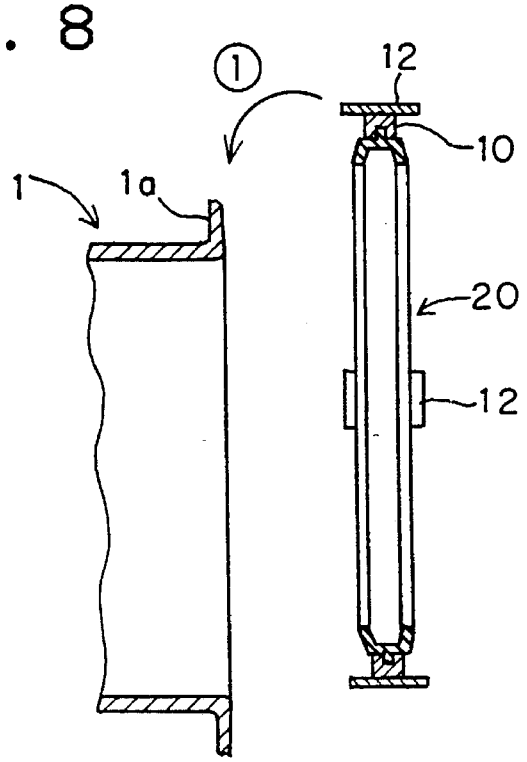
FIG. 8 is a sectional view illustrating an operation in the pipe connecting structure according to the embodiment 1 of the present invention.
Figure 9:
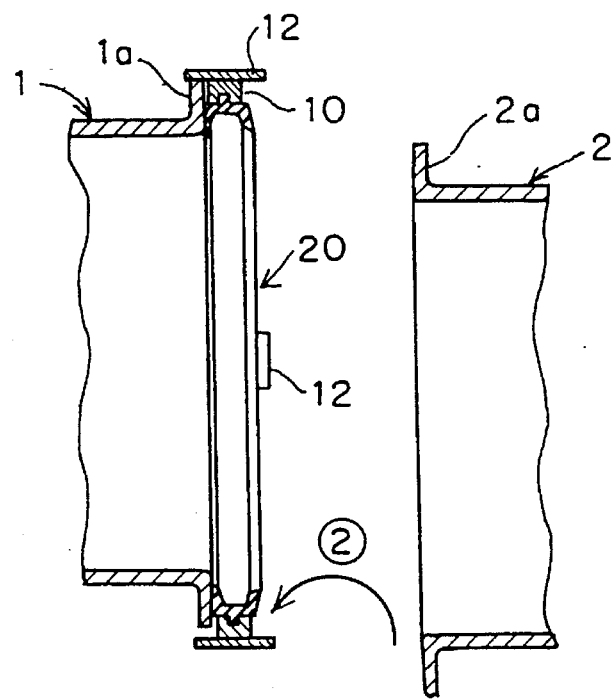
FIG. 9 is a sectional view illustrating another operation in the pipe connecting structure according to the embodiment 1 of the present invention.

Next, operation of this connecting structure according to the embodiment will be described. First, the flanges 1a and 2a are formed at the ends of the pipes 1 and 2, and the pipe 1 is rigidly lifted. The flange 1a of the rigidly lifted pipe 1 is fitted into the projections 12 of the back-up ring 10, thereby anchoring the projections 12 to the flange 1a (see FIGS. 8 and 9). Subsequently, the pipe 2 is temporarily lifted to fit the flange 2a of the pipe 2 into the projections 12 of the back-up ring 10, thereby anchoring the flange 2a to the projections 12. In this case, it is possible to hold the back-up ring 10 by dead weight of the pipe 2, and dispose the pipe 1 in substantially alignment with the pipe 2.

Figure 10:
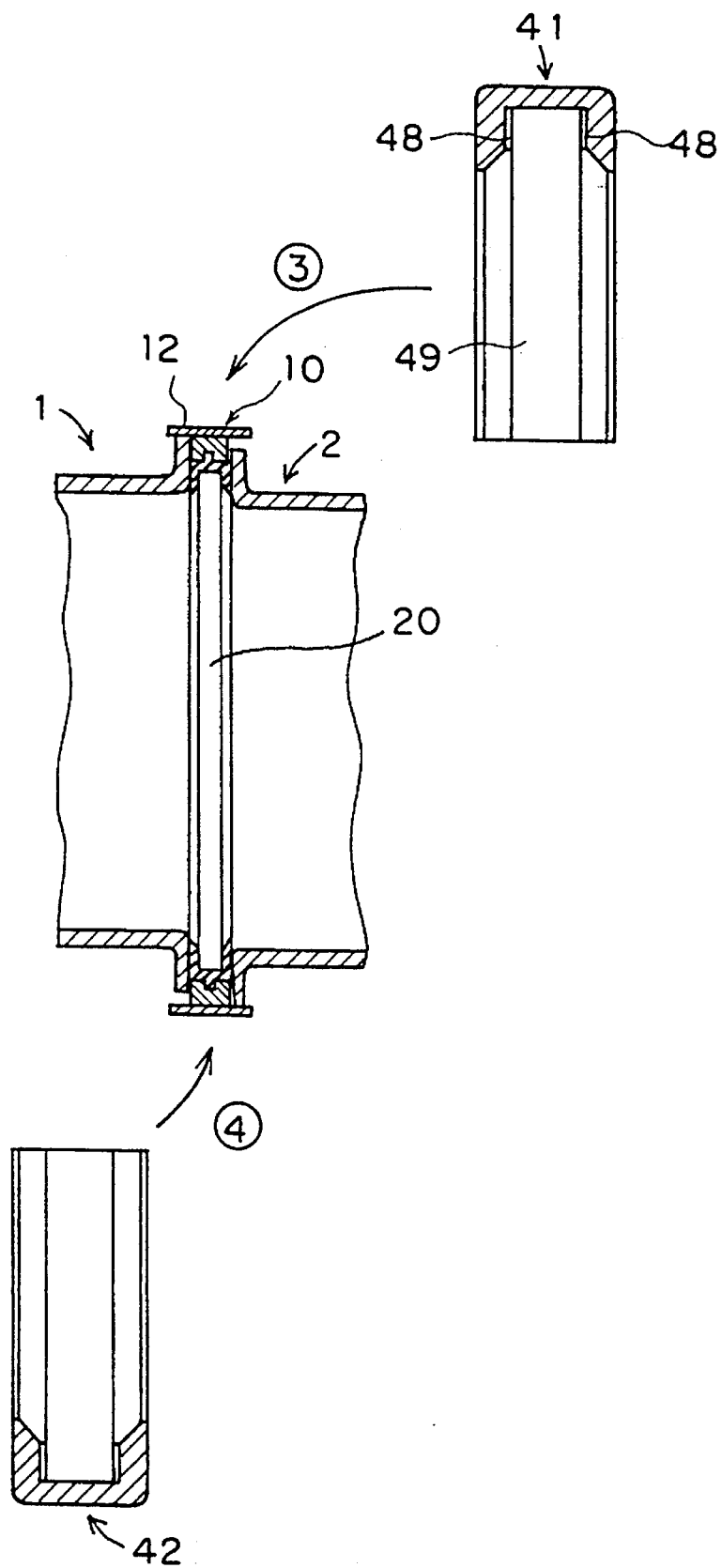
FIG. 10 is a sectional view illustrating another operation in the pipe connecting structure according to the embodiment 1 of the present invention.

Next, an upper half of the back-up ring 10 is coated with the upper half-divided body 41 of the housing 40 (see FIG. 10). In this case, the upper half of the back-up ring 10 is fitted into the inner peripheral groove 47 in the upper half-divided body 41, and the projections 12 of the back-up ring 10 are fitted into the grooves 48. Then, a lower half of the back-up ring 10 is coated with the lower half-divided body 42 of the housing 40 (see FIG. 10). In this case, as in the case of the upper half-divided body 41, the lower half of the back-up ring 10 is fitted into the inner peripheral groove 47 in the upper half-divided body 41, and the projections 12 of the back-up ring 10 are fitted into the grooves 48.

Figure 11:
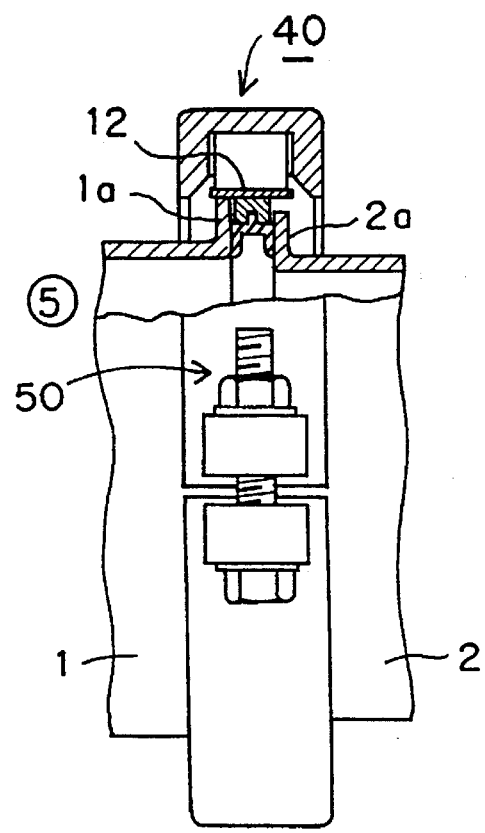
FIG. 11 is a sectional view illustrating another operation in the pipe connecting structure according to the embodiment 1 of the present invention.

It is thereby possible to coaxially position the bolt inserting hole 45 in the bracket 43 of the upper half-divided body 41 and the bolt inserting hole 45 in the bracket 44 of the lower half-divided body 42. Further, it is possible to coaxially position the bolt inserting hole 45 in the bracket 44 of the upper half-divided body 41 and the bolt inserting hole 45 in the bracket 43 of the lower half-divided body 42 (see FIG. 6). Thus, the bolts 51 pass through the respective bolt inserting holes 45 to be screwed with the nuts 52 (see FIG. 11). Next, the nut 52 is tightened by a box wrench or the like to assemble the housing 40 into the ring-like form. It is thereby possible to clamp outer peripheries of the pipes 1 and 2 by an inner periphery 41a of the upper half-divided body 41 and an inner periphery 42a of the lower half-divided body 42 (see FIG. 6). Therefore, the pipes 1 and 2 can be coaxially positioned, and can be connected in a state in which the pipes 1 and 2 are in alignment with each other.

At this time, the flanges 1a and 2a of the pipes 1 and 2 are pressed by the side walls 46 of the inner peripheral grooves 47 in the upper half-divided body 41 and the lower half-divided body 42, and the flanges 1a and 2a are brought into pressure contact with the rubber packing 20. Consequently, in an initial state, it is possible to remove any gap between the flanges 1a and 2a and the rubber packing 20, and ensure a water resistant performance at a time of lower pressures.

As stated above, the pair of pipes 1 and 2, and the back-up ring 10 can be anchored so that connection of the pipes requires only one operator. Further, it is possible to mutually connect the pipes 1 and 2 by simply clamping by the bolts 51 after mounting the housing 40. As a result, the method can eliminate the need for a special machine, a jig, a tool, or the like, and the operation can be easily performed without a skilled operator. When liquid flows in the pipes 1 and 2 at lower pressures, the water resistant performance can be maintained by removing the gap between the flanges 1a and 2a by pressing force generated from the housing 40. When liquid flows in the pipes 1 and 2 at higher pressures, the rubber packing 20 is externally expanded by the high pressure liquid. Thereby, the side walls of the rubber packing 20 can be brought into tight pressure contact with the flanges 1a and 2a, resulting in maintenance of the water resistant performance.

Figure 12:
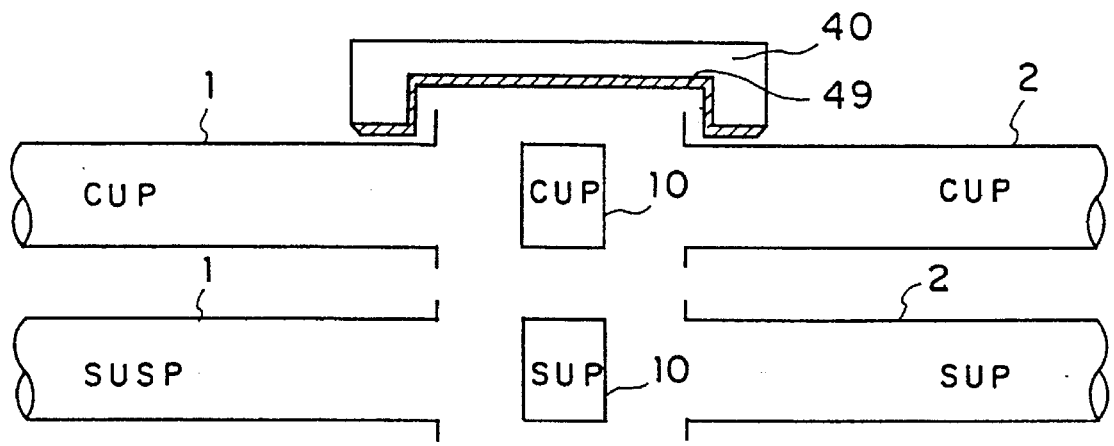
FIG. 12 is an explanatory view in case pipes to be connected are made of the same light metal.

Further, in the housing 40, the inner peripheries of the upper and lower half-divided bodies 41 and 42 are coated with the anti-corrosive and insulating resin 49 such as epoxy resin. As shown in FIG. 12, it is possible to connect pipes made of the same light metal, for example, pipes 1 and 2 respectively including copper pipes, or pipes 1 and 2 including the stainless pipes (SUSP). In this case, the back-up ring 10 is made of the same material as that of the connected pipes 1 and 2.

Figure 13:
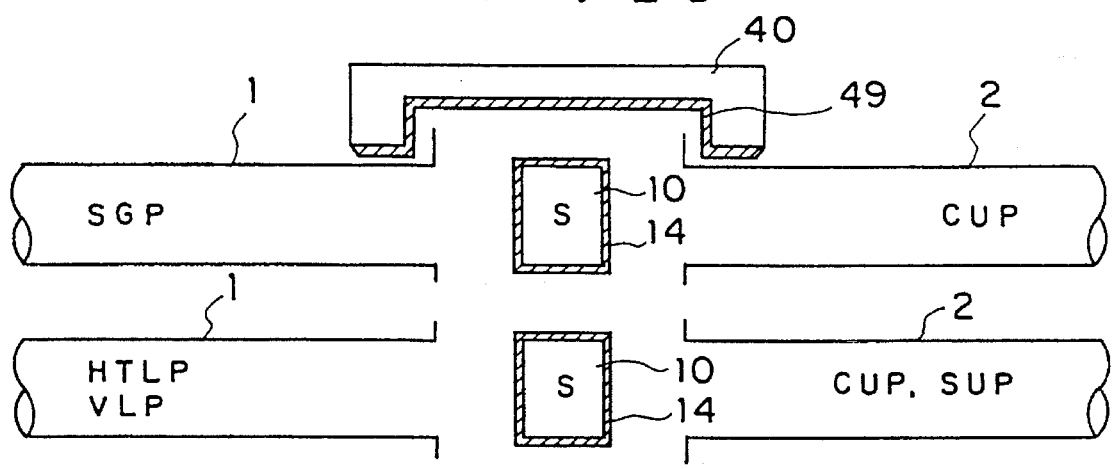
FIG. 13 is an explanatory view in case pipes to be connected are made of different light metals.

Further, as shown in FIG. 13, the pipes 1 and 2 made of different materials can be connected if the peripheral surface of the back-up ring 10 is coated with the anti-corrosive and insulating resin 49. For example, in available combinations, the pipe 1 including a carbon steel pipe (SGP) can be joined to the pipe 2 including the copper pipe, or the pipe 1 including a lining steel pipe or the like (HTLP, VLP) can be joined to the pipe 2 including the copper pipe or the carbon steel pipe. In such a case, since the back-up ring 10 is coated, the back-up ring 10 is not necessarily made of the same material as those of the pipes 1 and 2, and can be made of steel.

Figure 14:
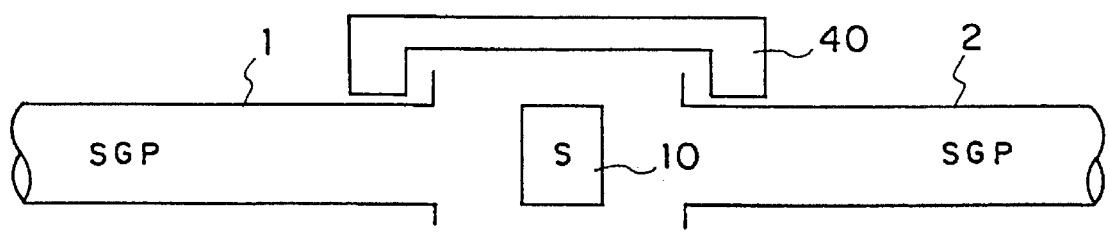
FIG. 14 is an explanatory view in case pipes to be connected are similarly made of carbon steel.

In case the pipes 1 and 2 include the carbon steel pipes, and the back-up ring 10 is made of steel, no coating is required for the housing 40 and the back-up ring 10 (see FIG. 14).

Embodiment 2

Figure 15:
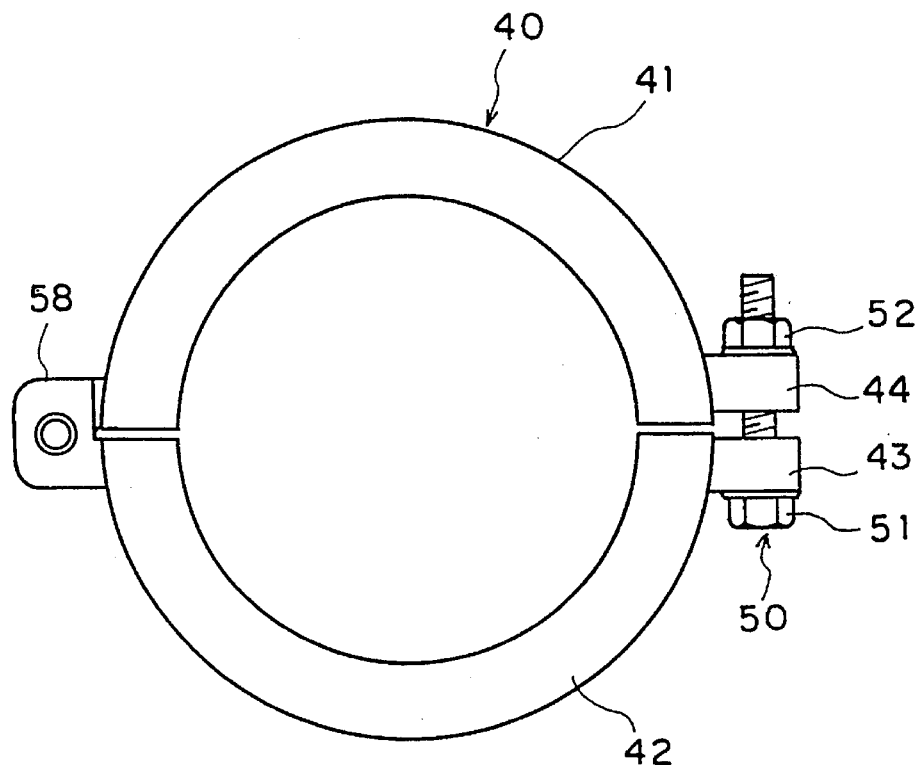
FIG. 15 is a front view of a housing used in a pipe connecting structure according to the embodiment 2 of the present invention.

In the embodiment 1, a description has been given of a case where a pair of bolts 51 are used as clamping means 50 for clamping an upper half-divided body 41 and a lower half-divided body 42. As shown in FIG. 15, an upper half-divided body 41 and a lower half-divided body 42 may be coupled by a hinge 58 at single sides thereof (third aspect). A housing 40 can be more easily assembled. As in the case of the embodiment 1, a nut accommodating groove 44a may be provided in a bracket 44, or no nut accommodating groove may be provided in the bracket 44. In FIG. 15, the same reference numerals are used for members identical with or equivalent to those in the embodiment 1, and descriptions thereof are omitted.

Embodiment 3

Figure 16:
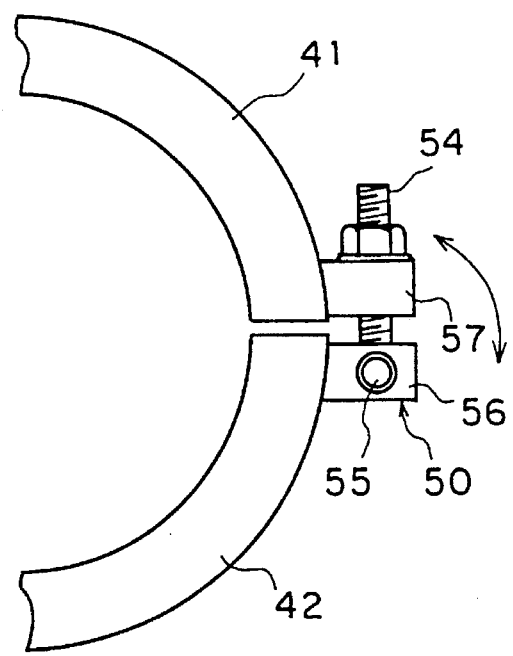
FIG. 16 is an enlarged view of an essential part of a housing used in a pipe connecting structure according to the embodiment 3 of the present invention.
Figure 17:
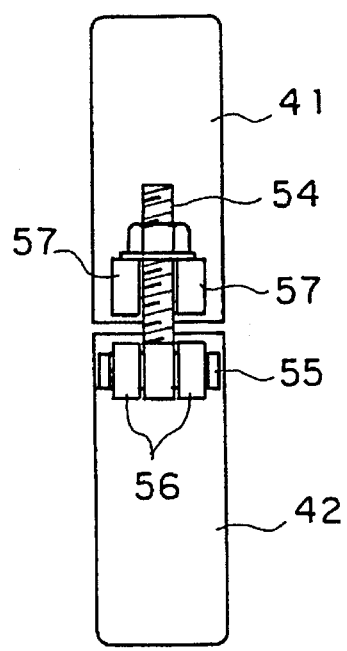
FIG. 17 is a side view of FIG. 16.

As shown in FIGS. 16 and 17, a bolt 54 may be swingably supported by a bracket 56 through a pin 55 so as to serve as clamping means 50 for clamping upper and lower half-divided bodies 41 and 42 (fourth aspect). It is thereby possible to position the bolt 54 between brackets 57 of the upper half-divided body 42 by simply swinging the bolt 54 about the pin 55, resulting in facilitated assembly of a housing 40. As in the case of the embodiment 1, a nut accommodating groove 44a may be provided in a bracket 44, or no nut accommodating groove may be provided in the bracket 44.

Embodiment 4

Figure 18:
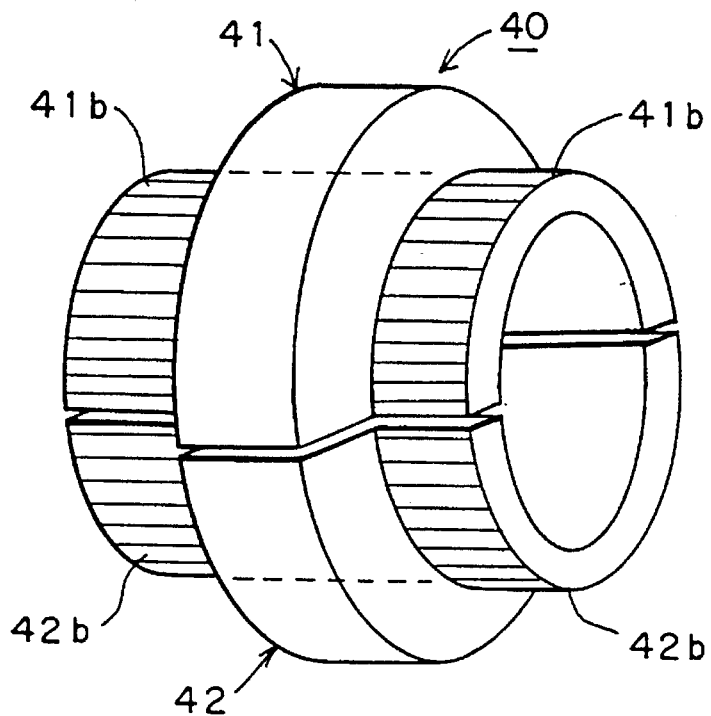
FIG. 18 is a perspective view of an image of a housing according to the embodiment 4 of the present invention.
Figure 19:
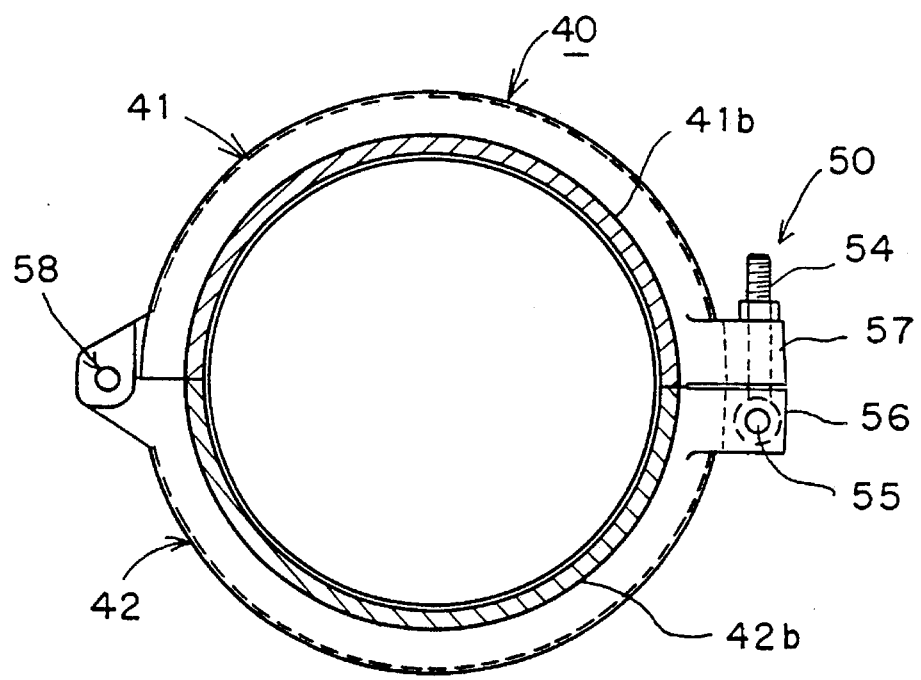
FIG. 19 is an end face view of FIG. 18.
Figure 20:
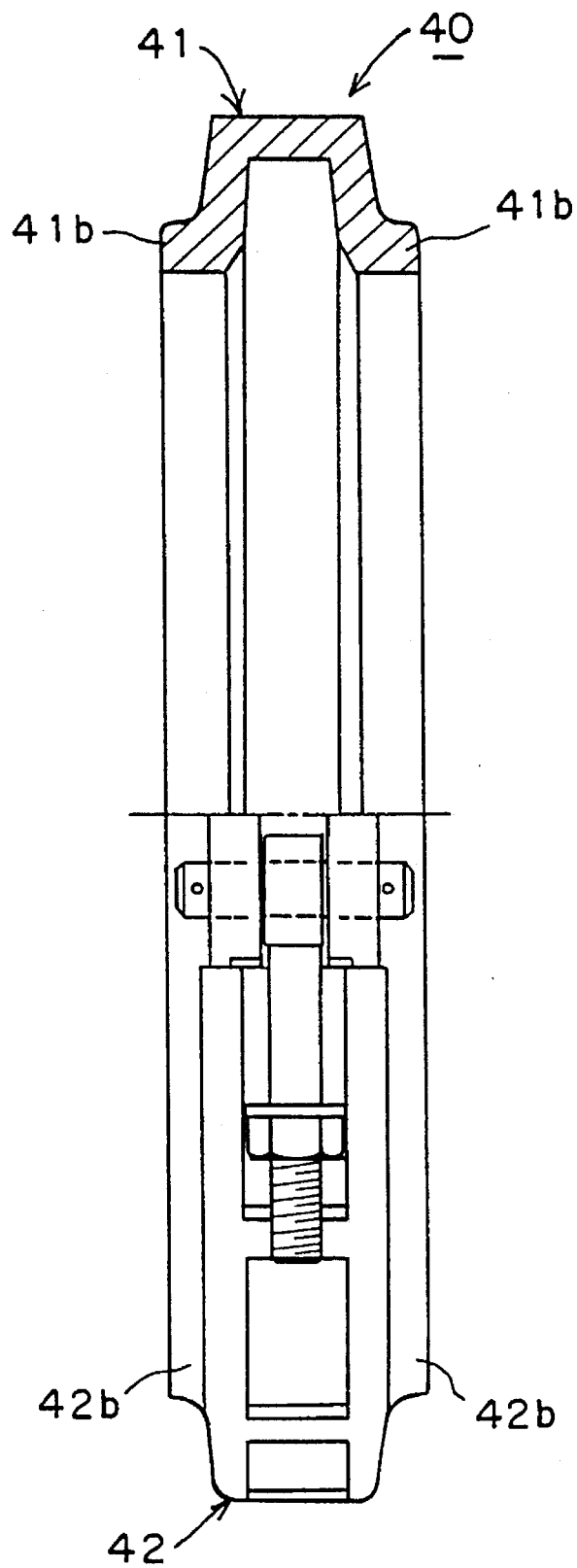
FIG. 20 is an enlarged sectional view in which a half of the housing shown in FIG. 19 is cut away.
Figure 21:
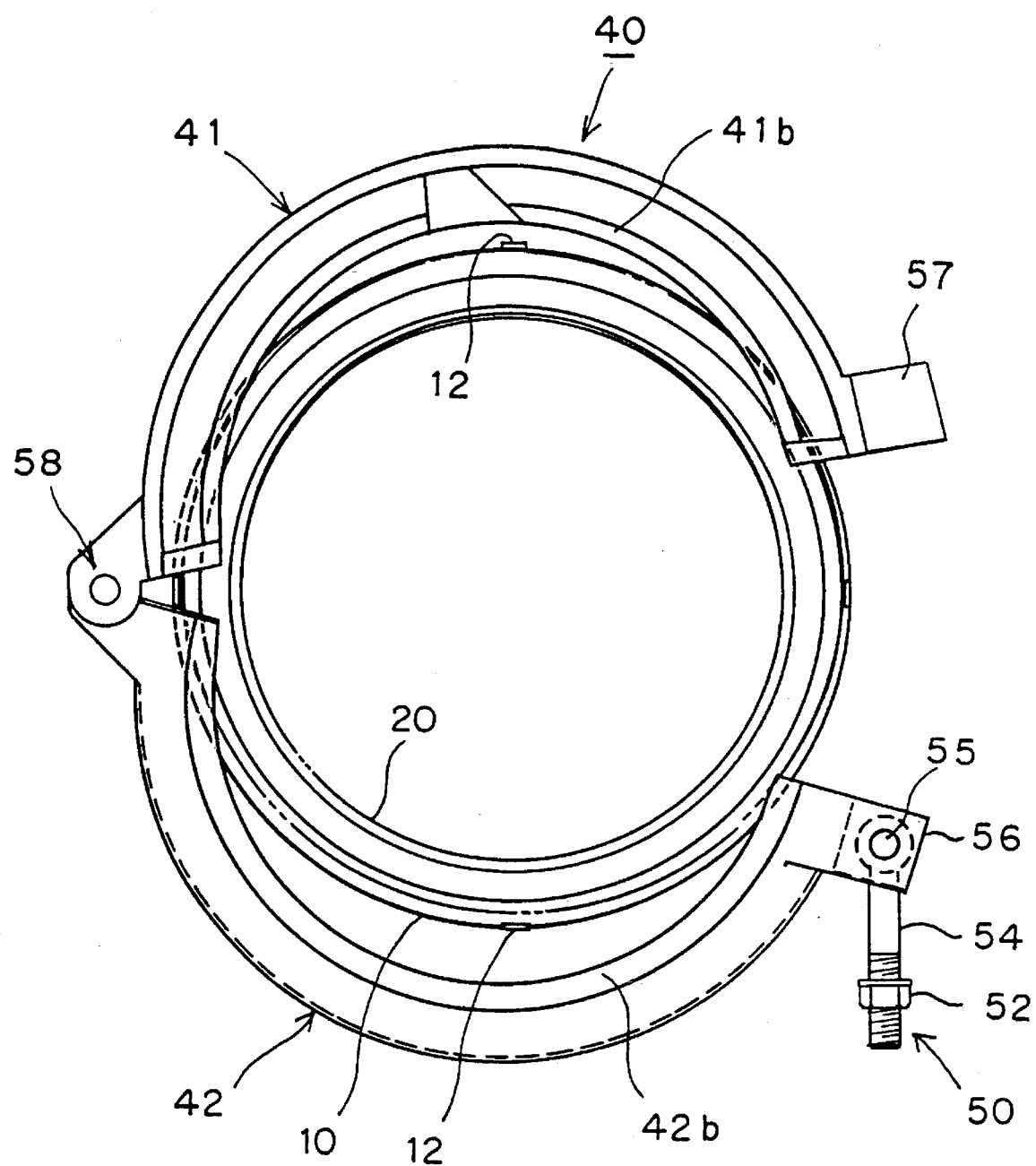
FIG. 21 is an explanatory view showing pipe connecting process by the housing shown in FIG. 18.
Figure 22:
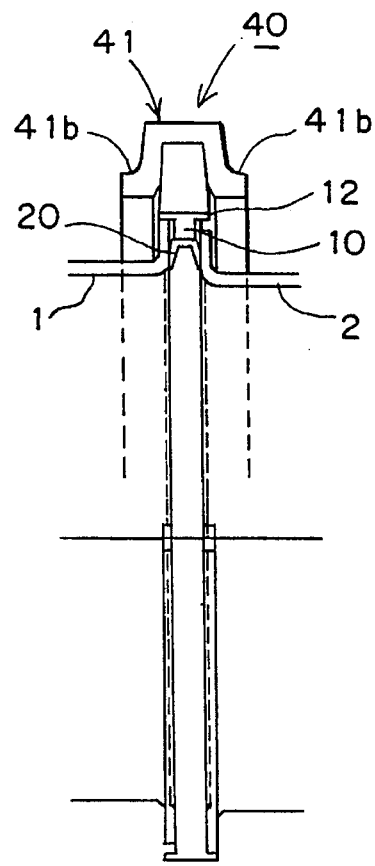
FIG. 22 is a sectional view of FIG. 21.

FIG. 18 is a perspective view of an image of a housing according to the embodiment 4 of the present invention. FIG. 19 is an end face view of FIG. 18, and FIG. 20 is a sectional view in which a half of the housing shown in FIG. 19 is cut away.

In the embodiment 4, collar portions 41b, 42b are provided integrally with a pair of half-divided bodies 41 and 42 forming the housing 40, and have semicircular arc-like inner peripheral surfaces axially and outwardly extending from inner peripheral ends of both side walls of the half-divided bodies (second aspect). In this case, inner diameters of the collar portions 41b, 42b are set to be substantially equal to outer diameters of pipes 1, 2 to be connected.

According to the embodiment 4, as in the case of the embodiment 1, a back-up ring 10 and a rubber packing 20 are assembled between flanges 1a and 2a of the pipes 1 and 2, and are fitted into inner peripheral grooves 47 in the upper and lower half-divided bodies 41 and 42. In this state, the half-divided bodies 41 and 42 are mutually tightened by clamping means 50. Consequently, the semicircular arc-like inner peripheral surfaces of the collar portions 41b, 42b of the respective half-divided bodies 41, 42 are clamped and brought into pressure contact with outer peripheral surfaces of the pipes 1 and 2 in the vicinity of the flanges 1a, 2a in a surface contact state.

As stated above, the collar portions 41b, 42b axially extending from the inner peripheral ends of both side walls of the respective half-divided bodies 41 and 42 are clamped and brought into pressure contact with the outer peripheral surfaces of the pipes 1 and 2. It is thereby possible to provide larger areas in which the half-divided bodies 41 and 42 mutually come into pressure contact with the pair of pipes 1 and 2. Hence, mutual centers of the pipes 1 and 2 can be naturally aligned with high accuracy, and the respective half-divided bodies 41, 42 can clamp the pipes 1, 2 with higher strength. Further, it is possible to provide sufficient strength of the housing 40, and carry out highly reliable pipe connection.

In the embodiment 4, the half-divided bodies 41, 42 are coupled by the hinge 50 at the mutual single sides of the half-divided bodies, and the other sides thereof can be clamped by the clamping means 50 or can be released from the clamping. Since the clamping means 50 is identical with that shown in FIG. 16, the same reference numerals are used for corresponding counterparts, and descriptions thereof are omitted. Further, since structures of the back-up ring 10 and the rubber packing 20 are identical with those in the embodiment 1, the same reference numerals are used for corresponding counterparts, and descriptions thereof are omitted.

Alternatively, in the embodiment 4, the clamping means 50 for mutually clamping both the half-divided bodies 41 and 42 may be identical with that as shown in FIGS. 2 and 15 to provide the same effects. Further, in the embodiment 4, the entire inner peripheral surfaces of the half-divided bodies 41, 42, including the collar portions 41b, 42b, may be coated with anti-corrosive and insulating resin. In this case, it is possible to provide the same effects by selectively using a back-up ring 10 shown in FIG. 12 or another back-up ring 10 coated with the anti-corrosive and insulating resin 14 as shown in FIG. 13 according to material of the pipes 1 and 2 to be connected.

Embodiment 5

Figure 23:
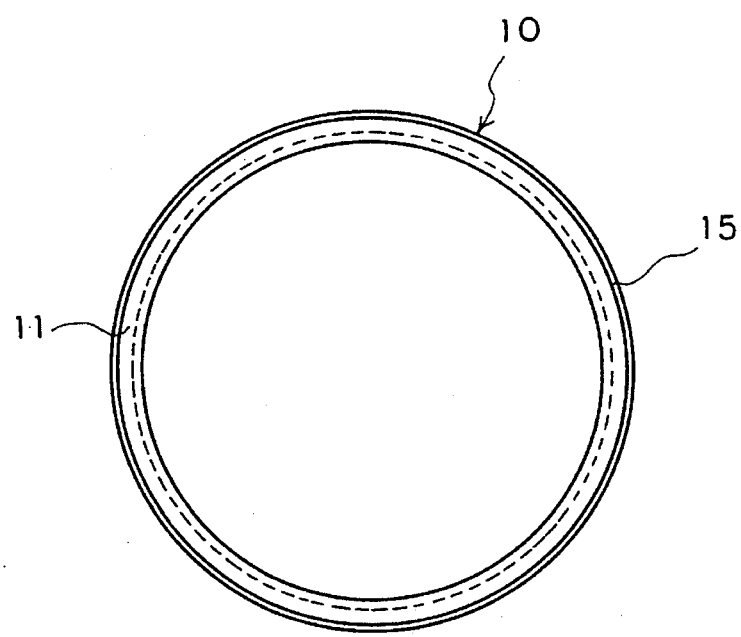
FIG. 23 is a front view of a back-up ring used in a pipe connecting structure according to the embodiment 5 of the present invention.

In the embodiment 1, a description has been given of a back-up ring 10 in which projections 12 extend from an outer periphery of a back-up ring body 11 at intervals of quadrantal arc. However, as shown in FIG. 23, a ring-like projection 15 may be provided for the outer periphery of the back-up ring body 11 (eighth aspect).

Embodiment 6

Figure 24:
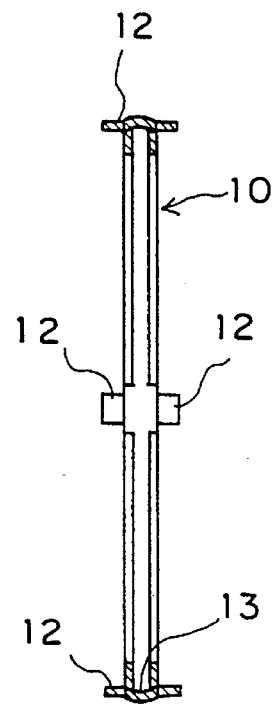
FIG. 24 is a sectional view of a back-up ring used in a pipe connecting structure according to the embodiment 6 of the present invention.
Figure 25:
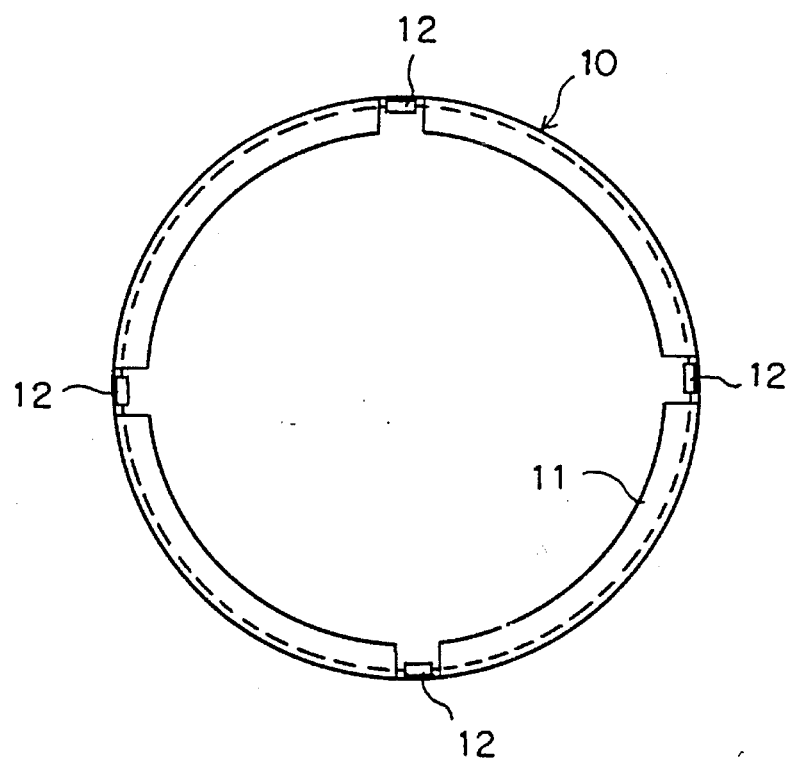
FIG. 25 is a front view of FIG. 24.

Back-up rings 10 described in the embodiments 1 and 5 are formed by cutting metals. However, as shown in FIGS. 24 and 25, another back-up ring 10 may be formed by pressing a flat bar (eleventh aspect). It is thereby possible to provide a lighter back-up ring than a flat back ring obtained by machining metals. In FIGS. 24 and 25, the same reference numerals are used for members identical with or equivalent to those in the embodiments 1 and 5, and descriptions thereof are omitted.

Embodiment 7

In the embodiments 1 to 4, bolts, nuts, and spring washers are used to mutually clamp flanges 43 and 44, and flanges 56 and 57. However, in case pipes 1 and 2 are joined and installed at a largely vibrated site, a clamping unit as shown in FIG. 26 is preferably employed. In the clamping unit, an openable cross-shaped slit 61 is provided in a distal end of a bolt 60, and a clamping body 63 including a nut 62 is provided with a projection 64 which is inserted into the slit 61 in the bolt 60 projecting from the nut 62 to open the slit 61.

Figure 26A:
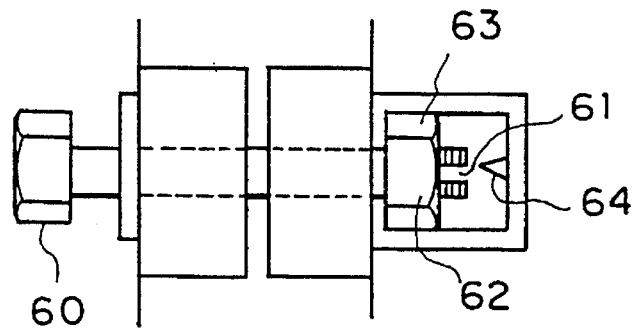
FIGS. 26(a) to 26(c) are diagrams illustrating an operation of clamping means used in a pipe connecting structure according to the embodiment 7 of the present invention.
Figure 26B:
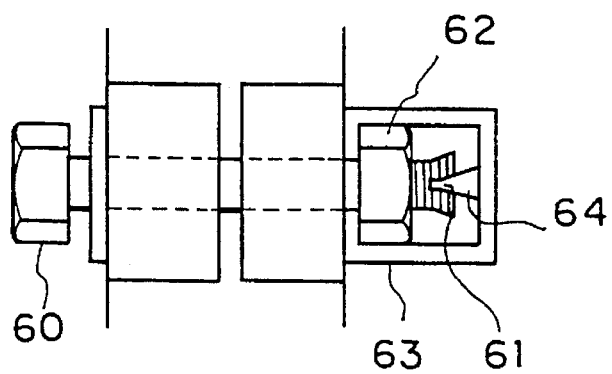
Figure 26C:
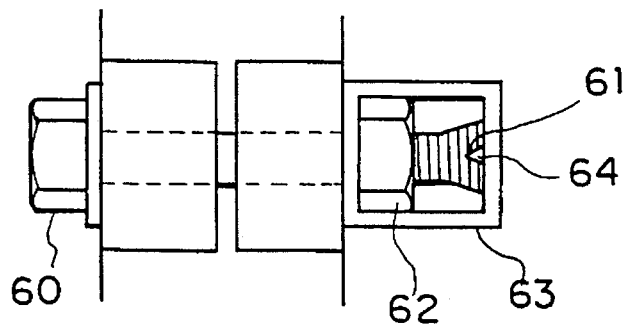

In the clamping unit, when the bolt 60 is screwed after a state shown in FIG. 26(a), the projection 64 is inserted into the slit 61 in the distal end of the bolt 60 as shown in FIG. 26(b). As the bolt 60 is further screwed, the slit 61 and the distal end of the bolt 60 are more opened by the projection 64 as shown in FIG. 26(c), thereby preventing the bolt 60 from dropping off the nut 62.

As stated above, according to the first aspect of the present invention, the back-up ring anchors the flange of the one tube, and the flange of the other pipe anchors the projections of the back-up ring to temporarily tack the pair of flanges and the back-up ring. Further, the pair of flanges and the back-up ring are covered with the housing and are brought into pressure contact with the pair of rubber packings and the pair of pipes are coaxially supported by clamping the housing by the clamping means. As a result, there are effects in that the pipes to be connected can be easily aligned and anchored, the connecting operation of the pipes can be carried out by one operator, and the conventional operation time can be reduced to one-fifth or less. Further, there are other effects in that the pipes can be joined by an unskilled operator using only one method irrespective of the pipe type or irrespective of the pipe diameter, and the method requires the clamping tool for the housing and eliminates the need for the thread cutting device, the dedicated machines for brazing and welding, and the jigs. In addition, there is another effect in that the pressure resistant and water resistant performance can be improved since high pressure liquid flowing in the joined pipes serves to enhance contact pressure between the rubber packing and the pipe flanges.

According to the second aspect of the present invention, the pair of half-divided bodies forming the housing are provided integrally with the collar portions axially and outwardly extending from the inner peripheral ends of both side walls of the respective half-divided bodies. The collar portions have the semicircular arc-like inner peripheral surfaces which are clamped and brought into pressure contact with the outer peripheral surfaces of the pair of pipes in the vicinity of the flanges in the surface contact state. These collar portions extend the area where the half-divided bodies mutually come into pressure contact with the pair of tubes. As a result, there are effects in that mutual centers of the pipes to be connected can be naturally aligned with high accuracy, strength of the housing can be improved by the pair of half-divided bodies, and highly reliable pipe connection can be carried out.

According to the third aspect of the present invention, the pair of half-divided bodies forming the housing are opposed to one another, and opposed portions on both sides of the half-divided bodies are clamped by the clamping means to assemble the pair of half-divided bodies into a ring-like form. As a result, there are effects in that the housing can be clamped from the outside after the pair of flanges and the back-up ring are temporarily tacked, and the pipe connection can be easily carried out.

According to the fourth aspect of the present invention, the pair of half-divided bodies are opposed to one another, and one opposed portions are coupled by the hinge and the other opposed portions are clamped by the bolt to assemble the pair of half-divided bodies into the ring-like form. As a result, there are effects in that assembly of the housing can be facilitated, and the pipe connection can be easily carried out.

According to the fifth aspect of the present invention, the bolt clamping the pair of half-divided bodies is swingably mounted to the one half-divided body, and the bolt is positioned at a clamping position of the other half-divided body by swinging the bolt. As a result, there are effects in that the bolt can be easily mounted and the nut can be easily clamped.

According to the sixth aspect of the present invention, a nut slip preventing groove is provided in the half-divided body so as to avoid slip of the nut into which the bolt is screwed to clamp the pair of half-divided bodies. As a result, there is an effect in that the clamping by using the bolt can be easily carried out.

According to the seventh aspect of the present invention, the grooves are provided in the respective inner peripheries of the pair of half-divided bodies forming the housing, and the projections of the back-up ring are fitted into the grooves. As a result, there is an effect in that the housing can be easily positioned with respect to the back-up ring.

According to the eighth aspect of the present invention, the projection of the back-up ring is provided in the ring-like form, and the projection extends over the entire outer periphery of the back-up ring body. As a result, there is an effect in that the back-up ring can be easily anchored to the one flange by fitting the one flange into the projection, and the other flange can be easily anchored to the back-up ring by fitting the other flange into the projection.

According to the ninth aspect of the present invention, the projections of the back-up ring extend from the outer periphery of the back-up ring body at predetermined intervals. As a result, there is an effect of realizing cost reduction.

According to the tenth aspect of the present invention, the projection is secured to the back-up ring body through a mounting member, and the pair of flanges are fitted into the projection. As a result, there is an effect in that the projection can be easily mounted to the back-up ring.

According to the eleventh aspect of the present invention, the flat bar is formed into the back-up ring. As a result, there is an effect of facilitated production.

According to the twelfth aspect of the present invention, the peripheral surface of the back-up ring is coated with the anti-corrosive and insulating resin. As a result, there is an effect of cost reduction since the light metal pipes made of different materials can be mutually connected, and only one kind of back-up ring is required.

According to the thirteenth aspect of the present invention, the inner periphery of the housing is coated with the anti-corrosive and insulating resin. As a result, there is an effect of cost reduction since the light metal pipes can be mutually connected, and only one kind of housing is required.

While preferred embodiments of the invention have been described using specific terms, such description is for illustrative purposes only, and it is to be understood that changes and variations may be made without departing from the spirit or scope of the following claims.

What is claimed is:

1. A pipe connecting structure comprising:
   a pair of flanges formed at ends of a pair of pipes to be connected, and opposed to one another;
   a back-up ring interposed between said pair of flanges, said back-up ring having an outermost periphery and an innermost periphery;
   projections onto which said pair of flanges are fitted, said projections extending from said outermost periphery of said back-up ring;
   a flexible packing mounted to said innermost periphery of said back-up ring;
   a housing capable of accommodating said pair of flanges with said back-up ring interposed between them; and
   clamping means for clamping said housing.

2. A pipe connecting structure according to claim 1, wherein said housing includes a pair of half-divided bodies having a semicircular arc-like form to interpose said flanges of said pipes therebetween from the outside of a radial direction so as to provide a state where said flanges of said pair of pipes and the back-up ring including the flexible packing and said projections are accommodated in said housing, and said half-divided bodies being provided integrally with collar portions axially and outwardly extending from inner peripheral ends of both side walls of said respective half-divided bodies to have semicircular arc-like inner peripheral surfaces which are brought by said clamping means into pressure contact with outer peripheral surfaces of said pair of pipes in the vicinity of said flanges in a surface contact state.

3. A pipe connecting structure according to claim 1 or 2, wherein said clamping means includes bolts wherein said housing has opposed portions and said opposed portions of said housing are clamped by said bolts after a pair of half-divided bodies forming said housing are opposed to one another so as to assemble said housing into a ring-like form.

4. A pipe connecting structure according to claim 2, wherein said clamping means includes a bolt and a hinge, wherein one opposed portions of said housing are coupled by said hinge and the other opposed portions are clamped by said bolt after said pair of half-divided bodies forming said housing are opposed to one another so as to assemble said housing into a ring-like form.

5. A pipe connecting structure according to claim 2, wherein said clamping means includes a bolt swingably supported by one of said pair of half-divided bodies, and said bolt can be positioned at a clamping position of the other half-divided body by swinging said bolt.

6. A pipe connecting structure according to claim 2, wherein a nut slip preventing groove is provided in said half-divided body so as to avoid slip of a nut into which said bolt is screwed to clamp a pair of half-divided bodies together with said bolt.

7. A pipe connecting structure according to claim 2, wherein grooves are provided in inner peripheries of the pair of half-divided bodies forming said housing, and projections of said back-up ring are fitted into said grooves.

8. A pipe connecting structure according to claim 1 or 2, wherein the projections of said back-up ring extends from said outermost periphery of said back-up ring to form a single ring-like form.

9. A pipe connecting structure according to claim 1 or 2, wherein said projections of said back-up ring extend from said outermost periphery of said back-up ring at predetermined intervals.

10. A pipe connecting structure according to claim 1, wherein said projections are secured to said back-up ring through a mounting member.

11. A pipe connecting structure according to claim 1, wherein said back-up ring is formed from a flat bar.

12. A pipe connecting structure according to claim 1, wherein a peripheral surface of said back-up ring is coated with anti-corrosive and insulating resin.

13. A pipe connecting structure according to claim 1, wherein an inner peripheral surface of said housing is coated with anti-corrosive and insulating resin.

* * * * *